United States Patent
Bottrich et al.

(10) Patent No.: US 7,693,511 B2
(45) Date of Patent: Apr. 6, 2010

(54) MOBILE TELEPHONE SIGNALING TO A NETWORK TO CAUSE CALLS DIRECTED TO ANOTHER MOBILE TELEPHONE TO BE REDIRECTED

(75) Inventors: Michael Bottrich, Ulm (DE); Matti Sydanmaa, Tampere (FI); Tommi Ojala, Tampere (FI); Kimmo Alanen, Lempaala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/451,601

(22) PCT Filed: Dec. 14, 2001

(86) PCT No.: PCT/EP01/15410

§ 371 (c)(1),
(2), (4) Date: Nov. 21, 2003

(87) PCT Pub. No.: WO02/51170

PCT Pub. Date: Jun. 27, 2002

(65) Prior Publication Data

US 2004/0067749 A1    Apr. 8, 2004

(30) Foreign Application Priority Data

Dec. 19, 2000    (GB) ................... 0030968.2

(51) Int. Cl.
*H04M 3/42* (2006.01)
(52) U.S. Cl. .............. 455/417; 455/445; 455/461; 455/552.1; 455/553.1
(58) Field of Classification Search .............. 455/417, 455/414.1, 445, 569.1, 569.2, 410, 411, 553.1, 455/11.1, 579.9, 41.2–41.3, 456.1–456.3, 455/456.5–456.6, 461, 552.1
See application file for complete search history.

(56) References Cited

U.S. PATENT DOCUMENTS

| | | | | |
|---|---|---|---|---|
| 4,748,655 A | * | 5/1988 | Thrower et al. | 455/461 |
| 4,989,230 A | * | 1/1991 | Gillig et al. | 455/552.1 |
| 5,210,785 A | * | 5/1993 | Sato et al. | 455/552.1 |
| 5,675,629 A | | 10/1997 | Raffel et al. | 379/58 |
| 5,845,207 A | * | 12/1998 | Amin et al. | 455/417 |
| 5,920,815 A | * | 7/1999 | Akhavan | 455/417 |
| 5,966,667 A | | 10/1999 | Halloran et al. | 455/552 |
| 6,125,283 A | | 9/2000 | Kolev et al. | 455/552 |

(Continued)

FOREIGN PATENT DOCUMENTS

EP    0996272 A1    10/1999

(Continued)

*Primary Examiner*—William D Cumming
(74) *Attorney, Agent, or Firm*—Harrington & Smith

(57) ABSTRACT

Methods and apparatus support communication between a communication device and a compatible communication device over a telecommunications network. The communication devices have unique identities. The methods and apparatus are configured to detect the presence of the compatible communication device using a low power radio frequency technology; to determine the identity of the detected compatible communication device; and, in response to detection of the presence of the compatible communication device, to redirect incoming calls intended for the detected compatible communication device having the determined identity to the communication device, wherein the controller sends control signals to the compatible communication device, such that the compatible communication device can control the redirection of the incoming calls at the network.

27 Claims, 2 Drawing Sheets

U.S. PATENT DOCUMENTS

| | | | |
|---|---|---|---|
| 6,253,088 B1 * | 6/2001 | Wenk et al. | 455/417 |
| 6,349,212 B1 * | 2/2002 | Martensson et al. | 455/462 |
| 6,542,758 B1 * | 4/2003 | Chennakeshu et al. | 455/569.2 |
| 6,697,638 B1 * | 2/2004 | Larsson et al. | 455/553.1 |
| 6,999,769 B1 * | 2/2006 | Henon | 455/445 |

FOREIGN PATENT DOCUMENTS

| | | |
|---|---|---|
| GB | 2304258 A | 3/1997 |
| GB | 2322521 A | 8/1998 |
| GB | 2353126 A | 1/2001 |
| GB | 2353411 A | 2/2001 |

* cited by examiner

MOBILE TELEPHONE SIGNALING TO A NETWORK TO CAUSE CALLS DIRECTED TO ANOTHER MOBILE TELEPHONE TO BE REDIRECTED

TECHNICAL FIELD

The present invention relates to radiotelephones and, more particularly, to the management of multiple radiotelephones.

BACKGROUND

In recent years, the penetration of handheld portable radiotelephones has grown enormously, and now, in many countries, the majority of people possess a portable radiotelephone. Of these people, an increasing number also posses more than one portable radiotelephone, for example a car phone and a handheld mobile radiotelephone. One problem with this is that a user ends up having multiple telephone numbers and people trying to contact the user do not know on which radiotelephone the user is may be contacted.

Accordingly, one aim of the present invention is to overcome the above-mentioned problems of the prior art.

SUMMARY OF THE INVENTION

According to a first aspect of the present invention, there is provided a communication device for communicating with a compatible communication device over a telecommunications network, wherein the communication devices have unique identities, the communication device comprising: a detector for detecting the presence of the compatible communication device; determination means for determining the identity of the detected compatible communication device; and a controller effective for redirecting incoming calls intended for the detected compatible communication device having the determined identity to the communication device.

According to a second aspect of the present invention, there is provided a method of redirecting calls to a communication device from a compatible communication device, wherein the communication device and the compatible communication device have unique identities and are capable of communicating over a telecommunications network, the method at the communication device comprising: detecting the presence of the compatible communication device; determining the identity of the detected compatible communication device; and redirecting incoming calls intended for the compatible communication device having the determined identity to the communication device.

According to a third aspect of the present invention, there is provided a communications system having a first and a second communication device each having a unique identity and capable of being connected via a telecommunications network, wherein the first communication device comprises: a detector for detecting the presence of the second communication device; means for determining the identity of the second communication device; a controller effective for redirecting calls intended for the second communication device having the determined identity to the first communication device.

One advantage of the present invention is that a user is always contactable on whichever telephone they are currently using. This prevents people trying to contact the user from having to try multiple numbers in order to reach the user.

BRIEF DESCRIPTION OF THE DRAWINGS

The present invention will now be described, by way of example only, with reference to the accompanying drawings, in which.

DETAILED DESCRIPTION OF THE INVENTION

Figure 1:
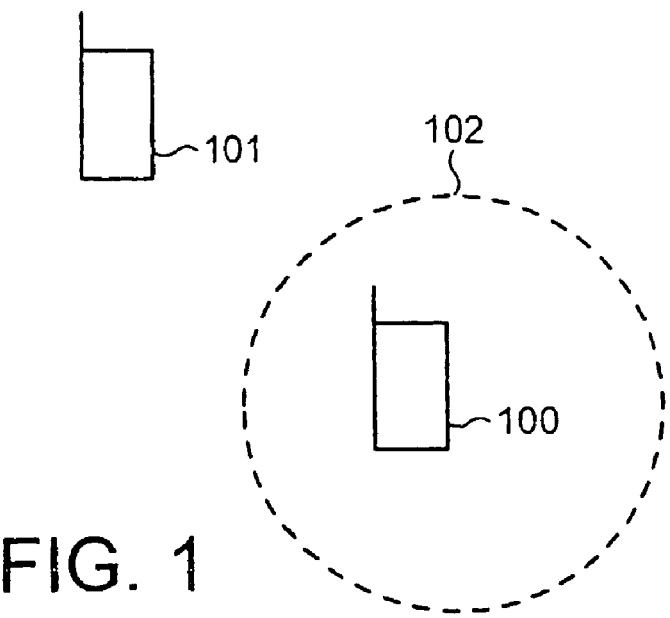
FIG. 1 shows a first embodiment of the present invention according to the present invention.

FIG. 1 shows a mobile phone 100, preferably mounted in a fixed location such as a car. The mobile phone, hereinafter referred to as car phone 100, has a detector (not shown) which can detect the presence of a compatible mobile telephone 101 within a range 102.

For the purposes of this description the term car phone will be used to describe a mobile telephone mounted in a car, and the term mobile telephone will be used to describe a handheld mobile telephone.

If the user has both a car phone and a mobile telephone this can cause severe confusion for people trying to contact the user. For example, whilst driving the car the user may be unable, due to safety reasons or legislation, to use his mobile telephone. Additionally, whilst out of the car the user will not be able to answer the car phone. Someone trying to contact the user on his mobile telephone number whilst he is driving will therefore be unable to be connected, unless he redials using the number of the car phone. Someone trying to call the user will therefore will require both the number of the car phone and the mobile telephone and may have to try calling both numbers in order to reach the user, depending on whether the user is in or out of the car.

Each of the telephones 100 and 101 contain a subscriber identification module (SIM) which provide each of the telephones with a unique subscriber number (i.e. a telephone number). In this way, each of the telephones 100 and 101 may operate independently. However, as described above, this does present the user with a number of problems.

When the mobile telephone 101 is detected within the range 102 of the car phone 100, the car phone 100 can be programmed to perform a number of predetermined tasks. Such tasks may include initiating network based call forwarding from the mobile telephone to the car phone, determining the identity of the detected phone, authorising the detecting phone etc . . .

For example, when a user having a mobile telephone enters a car having a car phone, the car phone detects the presence of the mobile telephone and causes all subsequent phone calls to the mobile telephone to be diverted to the car phone. In this way, calls to the mobile telephone may be safely answered using the car phone. Typically a car phone is specially designed to be safely operated whilst driving and may include features such a separate loudspeaker and microphone, a separate display and a separate control panel. When the user leaves the car, the car phone no longer detects the presence of the mobile telephone and cancels the call forwarding. This arrangement enables the user to be always contactable on a single subscriber number, that of his mobile telephone.

In an embodiment having a car phone, it is preferable that the range in which a compatible telephone can be detected is limited so as not to extend beyond the perimeter of the car. This is to prevent unintentional detection of compatible telephones whilst outside of the car.

Figure 2:
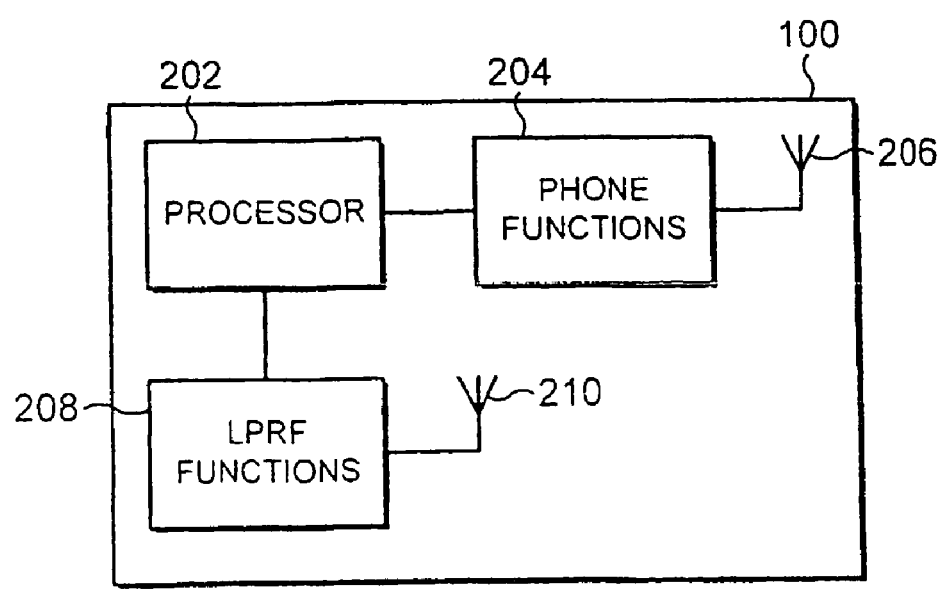
FIG. 2 is a block diagram showing the telephone 100 of FIG. 1 in greater detail.

FIG. 2 is a block diagram showing the telephone 100 of FIG. 1 in greater detail.

The mobile telephone 100 of FIG. 1 has a central processor 202 which is connected to a control module 204 which controls the expected functions of a mobile telephone, such as the key pad, call management, display, etc. These functions will not be described in detail as they are well understood in the art, and do not directly form part of the present invention. An antenna 206 is used to transmit signals to and to receive signals from a cellular or other wireless telecommunications network. Also connected to the processor 202 is a module 208 which controls the function of a local wireless connection, via an antenna 210. The module 208 may use low power radio frequency (LPRF) technology, such as the commonly called Bluetooth standard, to communicate to similarly equipped devices. Alternatively, the module 208 may use any other appropriate communication medium, for example, an infrared link, or even a direct electrical connection which may be provided through a mobile phone holder.

In LPRF communications it is common for one device to act as a master to other slave devices. In the present embodiment it is preferred that the car phone acts as the master device, and the mobile phone acts as the slave device, although the invention will work equally well with the reverse arrangement. The car phone transmits a signal over the LPRF network requesting other compatible devices to respond over the LPRF network. Since the car phone transmits these requests frequently this increases the power requirements of the car phone. It is for this reason that it is preferable that the car phone is chosen to be the master device, since the car phone will generally be connected to a large capacity car battery.

Figure 3:
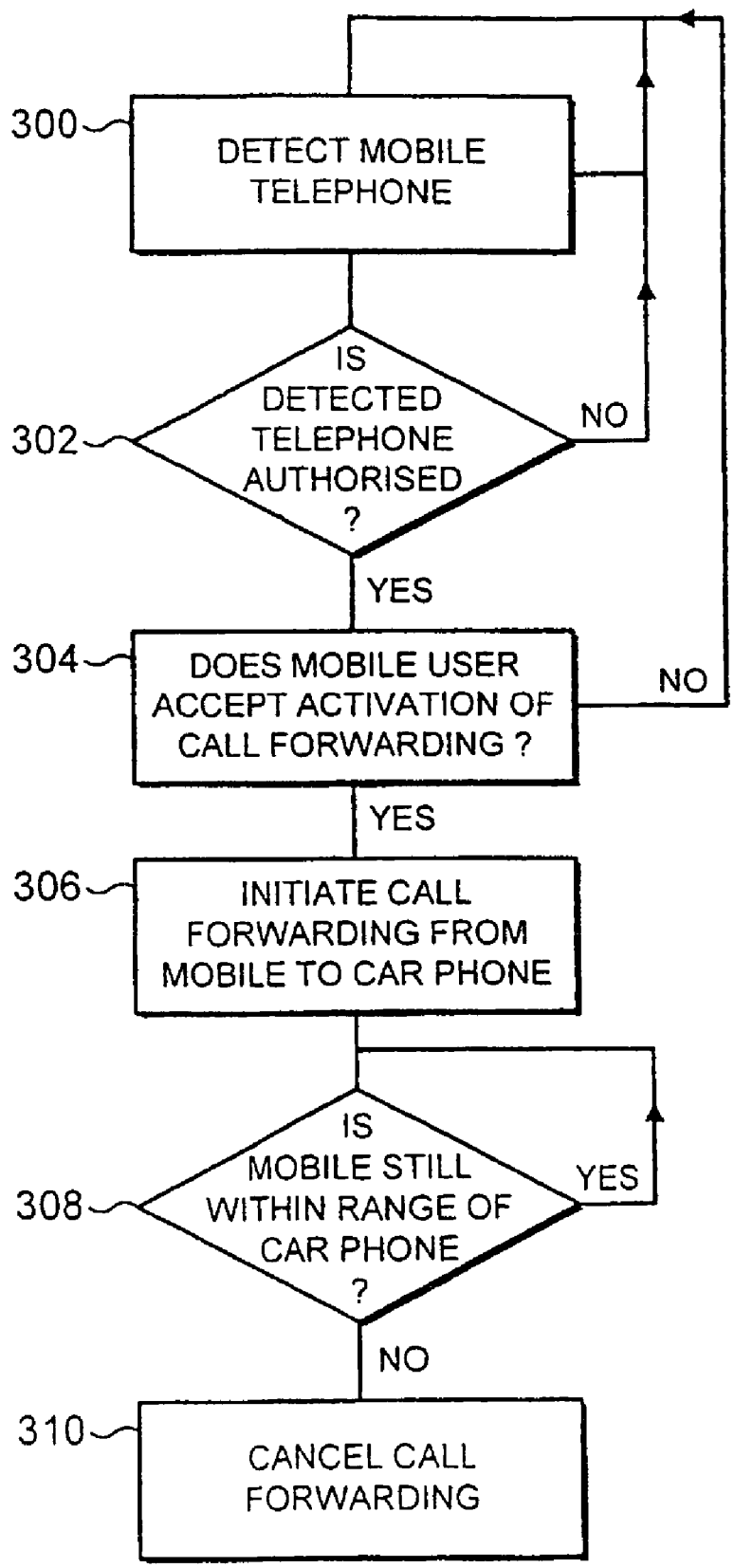
FIG. 3 is a flow diagram outlining the main steps of one embodiment according to the present invention.

When a compatible device, such as the mobile phone 101 is within range of the master LPRF signal transmitted by the car phone, the request signal is received by the slave LPRF module of the mobile phone 101. The slave LPRF module of mobile phone 101 transmits a signal to the master LPRF module of the car phone 100 indicating that the mobile phone 101 is within range of the car phone 100. The precise details regarding handshaking between the master and slave devices will not be discussed in detail here since they will be apparent to those skilled in the art. However, an outline of the steps undertaken by a master LPRF device according to one embodiment of the present invention are shown in FIG. 3.

The master LPRF module of the car phone 100 attempts to detect, at a step 300, the presence of a compatible mobile telephone 101 within transmission range of its signal. If no compatible mobile telephone is detected, the master LPRF module of the car phone 100 periodically transmits a request that any compatible device acknowledges with an appropriate response signal. Once a compatible device has been detected an authorisation step 302 is performed. The authorisation step 302 ensures that only authorised mobile telephones be used with the car phone. The authorisation step 302 determines the identity of the detected device, for example by determining the subscriber number of the device. Authorisation consists of comparing the identity of the detected device with a list of previously authorised identities. If the identity of the detected device is among the list of previously authorised identities, authorisation may be given, otherwise authorisation may be refused. Additionally, authorisation may require, for example, the entering of a security code by the user, either on the mobile phone or on the car phone in order to complete the authorisation step.

The car phone may also be configured to allow any compatible device to be used, regardless of identity.

The car phone 100 may, optionally at step 304, request confirmation from the user of the mobile telephone to initiate call forwarding from the mobile telephone 101 to the car phone 100. If the mobile phone user does not accept call forwarding, the master LPRF device of the car phone 100 returns to execute step 300.

The authorisation step may also add to the list of authorised mobile telephones any mobile telephones which are successfully used with the car phone. In other words, once a mobile telephone has been authorised for use with the car phone once, it will always be authorised until it is removed from the authorisation list.

If the user accepts activation of call forwarding, the car phone 100 initiates call forwarding of the mobile phone 101 to the car phone 100 at a step 306. In an alternative embodiment the car phone 100 may instruct the mobile telephone 101 to initiate call forwarding from the mobile telephone 101 to the car phone 100. The call forwarding may be performed on the network, by sending appropriate control signals to the network such that calls made to a given subscriber number are automatically re-routes to a forwarded number. Alternatively, call forwarding may be established by a mobile telephone handset itself. In this case, when a call arrives at a mobile telephone, the mobile telephone makes a new call to the forwarded number, and connects the calls together.

Once call forwarding is initiated, the master LPRF device of the car phone 100 periodically checks to see whether the mobile telephone 101 is still within range of the car phone. As soon as the mobile telephone 101 is no longer within range, for example when the user leaves the car with his mobile phone, call forwarding is automatically cancelled by the car phone 100. In an alternative embodiment the mobile telephone 101 acts to cancels the call forwarding when out of range of car phone 100. Preferably call forwarding is also cancelled whenever the LPRF link is broken, for example when the mobile telephone is switched off or when the battery of the mobile telephone runs out. It may be preferable in these instances to request confirmation from the user, via the car phone 100, as to whether call forwarding should be cancelled. If no response is received from the user within a given time period call forwarding may be cancelled automatically.

In yet a further embodiment of the present invention, the call forwarding performed by either the car phone 100 or the mobile phone 101 is user customisable. For example, there are many telephone companies which now provide so called personal or non-geographic telephone numbers. This allows a user to choose an easy to remember telephone number. Such telephone numbers are not associated with any particular telephone, but are forwarded to a predetermined telephone number. The call forwarding capability of the car phone or the mobile phone enables call forwarding of the personal number to which ever device is currently in use. For example, when a user enters the car, the car phone causes the personal number to be forwarded to the car phone. When the user leaves the car, the car phone causes the personal number to be forwarded to the mobile telephone.

In yet a further embodiment of the present invention, the mobile phone acts as the master LPRF device, and the car phone acts as the slave LPRF device.

It is common when using call forwarding that the telephone which is being forwarded is charged for the forwarded portion of the call. The telecommunications network operator, however, can arrange for these charges not to be incurred. The network operator can also arrange that calls made by the car phone, whilst having calls forwarded to it from a mobile telephone, show the caller line identification (CLI) of the forwarded mobile telephone. Additionally, the network operator can also arrange that calls made in this manner are billed to the forwarded telephone. In this way, calls made from the car phone will appear to be made by the mobile telephone which is forwarded thereto.

Although the present invention is described above with reference to a car phone and a mobile telephone, it will be appreciated that the car phone could be replaced by any other fixed or semi-permanent telephone having an LPRF module. For example, the present invention could also be used in an office or home environment. Additional embodiments provide that, for example in an office environment, when a user is at his desk, calls to a mobile telephone are forwarded to a desktop phone connected to a private switched telecommunications network (PSTN). When the user is away from his desk, this is automatically detected by the desktop phone (or the mobile telephone) and calls to the desktop phone may be automatically forwarded to the mobile telephone.

Those skilled in the art will appreciate that other combinations are also possible within the scope of the present invention. For example, the presence of the car phone could be detected by a mobile telephone, and the mobile telephone could effect the call forwarding in response to the detection.

Reference above to mobile telephone or car phone is also intended to include reference to radiotelephones and portable radiotelephones.

The invention claimed is:

1. A first mobile telephone comprising:
    a first module configured to detect presence of a second mobile telephone having a unique identity using a low power radio frequency technology;
    a second module configured to communicate with a wireless telecommunications network that does not use a low power radio frequency technology;
    a processor configured to determine the identity of the detected second mobile telephone;
    the processor further configured, responsive to the first module detecting the presence of the second mobile telephone, to initiate signaling to the telecommunications network to cause calls directed to the second mobile telephone having the determined identity to be redirected at the telecommunications network to the first mobile telephone; and
    the processor further configured, responsive to the first module detecting that the second mobile telephone is no longer present, to initiate signaling to the telecommunications network to cause calls directed to the second mobile telephone having the determined identity to no longer be redirected at the telecommunications network to the first mobile telephone.

2. The first mobile telephone of claim 1, wherein the first module is configured to establish communication with the second mobile telephone and to detect the second mobile telephone over a local connection which comprises one of a Bluetooth connection, an infra-red connection and a direct electrical connection through a holder for the mobile phone.

3. The first mobile telephone of claim 2, wherein the processor is configured to determine the identity of the detected other mobile telephone over the local connection.

4. The first mobile telephone of claim 1, wherein the processor is configured to initiate the signaling to redirect the calls by causing the second module to directly send control signals to the telecommunications network.

5. The first mobile telephone of claim 1, wherein the detector detects the presence of the second mobile telephone substantially within a predetermined range.

6. The first mobile telephone of claim 1, further comprising authorising means for authorising the use of the second mobile telephone with the first mobile telephone, and only initiating the said signaling if authorisation is given.

7. The first mobile telephone of claim 6, wherein the authorising means contains a list of the identities of authorised communication devices, and wherein authorisation is given only if the determined identity of the detected second mobile telephone matches one of the identities in the list of identities.

8. The first mobile telephone of claim 7, in which the processor is configured to add the determined identity of any detected compatible communication device to the list identities of authorised communication devices.

9. The first mobile telephone of claim 6, wherein the means for authorising further comprises a memory for storing a list of passwords associated with each identity in the list of identities, and wherein authorisation is given only when a matching password is entered on the first mobile telephone.

10. The first mobile telephone of claim 2, wherein the local connection is a low power radio frequency connection.

11. The first mobile telephone of claim 1, wherein the detector comprises a low power radio frequency transceiver configured to transmit and receive signals from compatible low power radio frequency transceivers.

12. The first mobile telephone of claim 2, wherein the local connection is an optical connection.

13. The first mobile telephone of claim 1, wherein the first mobile telephone comprises a car phone connected to a car battery.

14. A method comprising:
    a first mobile telephone detecting the presence of a second mobile telephone using a low power radio frequency technology;
    the first mobile telephone determining the identity of the detected a second mobile telephone; and
    in response to the detection of the presence of the second mobile telephone, the first mobile telephone initiating signaling to a telecommunications network which does not use a low power radio frequency technology to cause calls directed to the second mobile telephone having the determined identity to be redirected at the telecommunications network to the first mobile telephone; and
    in response to the first mobile telephone detecting that the second mobile telephone is no longer present, the first mobile telephone initiating signaling to the telecommunications network to cause calls directed to the second mobile telephone having the determined identity to no longer be redirected at the telecommunications network to the first mobile telephone.

15. The method of claim 14, wherein detecting the presence of the second mobile telephone comprises detecting the second mobile telephone over a local connection.

16. The method of claim 14, wherein determining the identity comprises determining the identity over the local connection.

17. The method of claim 14, wherein initiating the signaling to redirect the calls comprises the first mobile telephone directly sending control signals to the telecommunications network.

18. The method of claim 14, wherein detecting the presence of the second mobile telephone occurs whenever the second mobile telephone is substantially within a predetermined range of the first mobile telephone.

19. The method of claim 14, further comprising authorising the use of the second mobile telephone with the first mobile telephone, and only initiating the signaling if authorisation is given.

20. The method of claim 19, wherein authorising comprises comparing the identity of the detected second mobile telephone with a list of identities of authorised communication devices stored in the first mobile telephone, and only giving authorisation if a match occurs.

21. The method of claim 20, further comprising adding to the list of identities the identity of any detected communication device for which authorization is given.

22. The method of claim 19, wherein authorising further comprises comparing a password entered on the first mobile telephone with a list of passwords stored in the first mobile telephone in association with the list of identities, and wherein authorisation is given only when the entered password and the stored password for the detected second mobile telephone match.

23. The method of claim 15, wherein the detecting is over a low power radio frequency connection.

24. The method of claim 15, wherein the detecting is over an optical connection.

25. The method of claim 15, wherein the first mobile telephone comprises a car phone connected to a car battery.

26. The first mobile telephone of claim 1, wherein the processor is configured to initiate the signaling by causing the first module to send control signals to the second mobile telephone which direct the second mobile telephone to directly signal the telecommunications network to redirect the calls.

27. The method of claim 14, wherein initiating the signaling comprises the first mobile telephone sending control signals to the second mobile telephone which direct the second mobile telephone to directly signal the telecommunications network to redirect the calls.

* * * * *